US009430850B1

(12) United States Patent
Domanski et al.

(10) Patent No.: US 9,430,850 B1
(45) Date of Patent: Aug. 30, 2016

(54) SYSTEM AND METHOD FOR OBJECT DIMENSION ESTIMATION USING 3D MODELS

(71) Applicant: POLITECHNIKA POZNANSKA, Poznan (PL)

(72) Inventors: Marek Domanski, Poznan (PL); Tomasz Grajek, Poznan (PL); Krzysztof Klimaszewski, Murowana Goslina (PL); Adam Luczak, Poznan (PL); Robert Ratajczak, Lwowek (PL); Krzysztof Wegner, Murowana Goslina (PL)

(73) Assignee: POLITECHNIKA POZNANSKA, Poznan (PL)

( * ) Notice: Subject to any disclaimer, the term of this patent is extended or adjusted under 35 U.S.C. 154(b) by 0 days.

(21) Appl. No.: 14/690,484

(22) Filed: Apr. 20, 2015

(30) Foreign Application Priority Data

Apr. 2, 2015 (PL) ......................... 411827

(51) Int. Cl.
  *G06K 9/00* (2006.01)
  *G06T 7/60* (2006.01)
  *G06T 7/00* (2006.01)
  *G06K 9/62* (2006.01)
  *H04N 13/02* (2006.01)

(52) U.S. Cl.
  CPC . *G06T 7/60* (2013.01); *G06K 9/62* (2013.01); *G06T 7/004* (2013.01); *H04N 13/0203* (2013.01); *G06T 2207/10012* (2013.01)

(58) Field of Classification Search
  None
  See application file for complete search history.

(56) References Cited

U.S. PATENT DOCUMENTS

2006/0078172 A1* 4/2006 Zhang ................ G06K 9/00268
                                              382/118

(Continued)

*Primary Examiner* — Hadi Akhavannik
(74) *Attorney, Agent, or Firm* — Mark M. Friedman

(57) ABSTRACT

A method for estimation of dimensions of an object present on images obtained from a set of N cameras and representing the same scene from different viewpoints, based on a 3D object model. The method comprises determining (302) a 3DMM model. It further comprises matching (303) the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the i-th image and $\lambda_i$ describes the appearance/texture of the model matched to the i-th image. The method comprises calculating (304) relative positions of the cameras, from which the images were collected, based on 3D transformations $H_{ij}$ of the matched 3DMM model from the i-th image to the matched 3DMM model from the j-th image; and calculating (305) the total matching error $E_c$ for the model as a sum of matching errors of a model described by parameters $h_c$, $\rho_c$, $\lambda_c$ to individual images:

$$E_c = \sum_{i=1}^{N} E_i$$

The method further comprises estimating (306) the dimensions of the object based on locations of characteristic points from vector s, calculated as:

$$s = \bar{s} + \sum_k p_k \cdot \hat{s}_k$$

wherein $\bar{s}$ is the vector of the average 3DMM model shape, $\rho_k$ are elements of vector $\rho_c$, and $\hat{s}_k$ are eigenvalue vectors of the 3DMM model.

5 Claims, 3 Drawing Sheets

(56) References Cited

U.S. PATENT DOCUMENTS

2006/0267978 A1* 11/2006 Litke .................. G06T 17/30
  345/419

2009/0074238 A1* 3/2009 Pfister .................. G06T 7/0046
  382/100
2010/0215235 A1* 8/2010 Yoon .................. G06K 9/00369
  382/131

* cited by examiner

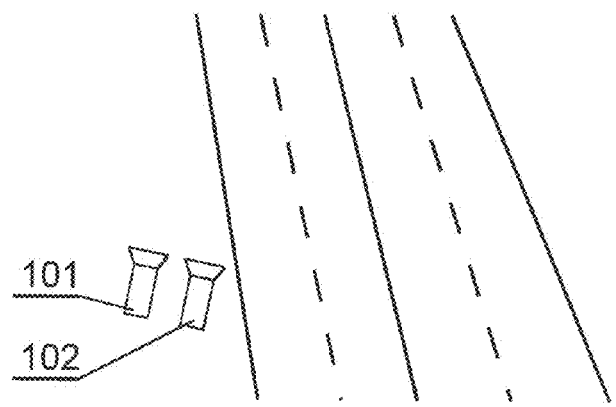
Fig. 4
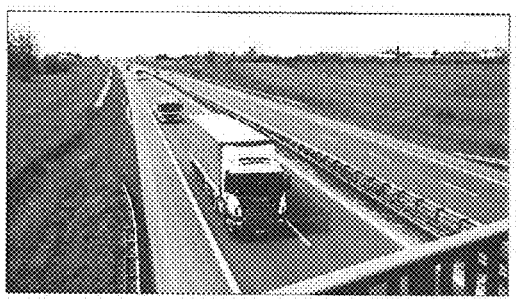
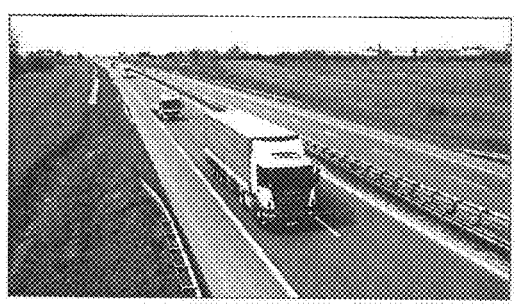
Fig. 5A  Fig. 5B
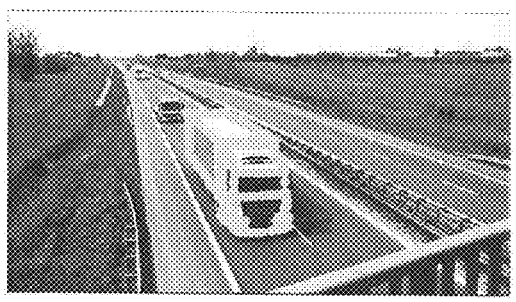
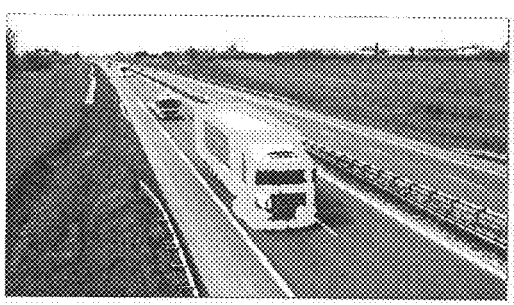
Fig. 6A  Fig. 6B

SYSTEM AND METHOD FOR OBJECT DIMENSION ESTIMATION USING 3D MODELS

TECHNICAL FIELD

The present disclosure relates to a system and method for object dimension estimation using 3D models. In particular, the disclosure relates to a road traffic surveillance system for estimation of dimensions of vehicles.

BACKGROUND

Computer vision is a field that includes methods for acquiring, processing, analyzing, and understanding images and, in general, high-dimensional data from the real world in order to produce numerical or symbolic information, e.g., in the forms of decisions. One of objectives of computer vision is to duplicate the abilities of human vision by electronically perceiving and understanding an image. This can be seen as disentangling of symbolic information from image data using models constructed with the aid of geometry, physics, statistics, and machine learning theory. Computer vision has also been described as the venture of automating and integrating a wide range of processes and representations for vision perception.

Sub-domains of computer vision include scene reconstruction, event detection, video tracking, object recognition, machine learning, indexing, motion estimation, and image restoration.

Computer vision can be employed in road traffic surveillance, for example to estimate dimensions of vehicles, e.g. to allow automatic collection of fees, to identify oversize vehicles that exceed allowable dimensions defined by law or to identify vehicles that cannot enter some areas such as tunnels, passes under bridges etc.

A U.S. Pat. No. 8,675,953 discloses an electronic device that determines a geometric scale of an object using two or more images of the object. During operation, the electronic device calculates the size of the object along a direction using multiple images of the object that were taken from different perspectives (such as different locations and/or orientations in an environment) along with associated imaging-device characteristics. For example, the size of the object may be calculated using the images, the associated focal lengths of a digital camera that acquired the images, and the law of cosines. Using the scale of the object, an image of the object may be appropriately scaled so that it can be combined with another image.

A publication "Vehicle Size and Orientation Estimation Using Geometric Fitting" (Christina Carlsson, Department of Electrical Engineering, Linköpings universitet, Linköping, Sweden (ISBN 91-7219-790-0)) discloses a vehicle size and orientation estimation process based on scanning laser radar data.

Active Appearance Model (AAM) is a technique which exploits deformable model matching into an object's image. Originally it was developed for face detection but it has been proved that the technique is useful for various kinds of objects. The AAM consists of two parts: shape and appearance (texture). The shape is defined by a set of points which are grouped into multiple closed polygons, while the appearance (texture) consists of all pixels that lie inside the defined shape.

A 3DMM (3D Morphable Model) is described in details e.g. in a publication by V. Blanz and T. Vetter "Face recognition based on fitting a 3D morphable model" (Pattern Analysis and Machine Intelligence, IEEE Transactions on, 25(9):1063-1074, 2003). 3DMM is based on AAM, wherein 3DMM is described as a set of three-dimensional vertices which compose a 3D shape representing the object, and an associated appearance texture.

There are known publications disclosing methods of matching 3DMM models to an image, such as:
- S. Romdhani and T. Vetter "Efficient, robust and accurate fitting of a 3D morphable model." (In Computer Vision. Proceedings. 9th IEEE International Conference on, pages 59-66. IEEE, 2003),
- J. T. Rodriguez "3D Face Modelling for 2D+3D Face Recognition" (PhD thesis, Surrey University, Guildford, U K, 2007).

There is also disclosed a method for matching of 3DMM model to a multiple images simultaneously, in the publication R. T. A. van Rootseler, L. J. Spreeuwers, R. N. J. Veldhuis "Application of 3D Morphable Models to faces in video images" (as published in Internet at: http://doc.utwente.nl/77273/1 NanRootseler-WICSP05.pdf)

The known methods that allow to determine the metric dimensions of objects require use of calibrated cameras which allow precise dimension measurement or laser scanners. For example, an image registered by two cameras aligned in parallel at a distance of 2 m from each other and observing an object distanced by 1 m having a size of 1 m will be the same as an image registered by two cameras aligned in parallel at a distance of 20 m from each other and observing an object distanced by 10 m having a size of 10 m. This is a problem of a scale of the camera system.

It would be advantageous to present a cost efficient and resource efficient system for object dimension estimation, that at the same time would require neither precise synchronization of the cameras nor knowledge of the external parameters of the cameras (i.e. the relative positioning of the cameras with respect to each other).

SUMMARY

The present disclosure presents a method for estimation of dimensions of an object present on images obtained from a set of N cameras and representing the same scene from different viewpoints, based on a 3D object model. The method comprises determining a 3DMM model. The method further comprises matching the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the i-th image and $\lambda_i$ describes the appearance/texture of the model matched to the i-th image. The method also comprises calculating relative positions of the cameras, from which the images were collected, based on 3D transformations $H_{ij}$ of the matched 3DMM model from the i-th image to the matched 3DMM model from the j-th image; and calculating the total matching error $E_c$ for the model as a sum of matching errors of a model, described by parameters $h_c$, $\rho_c$, $\lambda_c$, to individual images:

$$E_c = \sum_{i=1}^{N} E_i$$

The method further comprises estimating the dimensions of the object based on locations of characteristic points from vector s, calculated as:

$$s = \bar{s} + \sum_k p_k \cdot \hat{s}_k$$

wherein $\bar{s}$ is the vector of the average 3DMM model shape, $p_k$ are elements of vector $\rho_c$, and $\hat{s}_k$ are eigenvalue vectors of the 3DMM model.

There is also disclosed a computing device program product for estimation of dimensions of an object present on images obtained from a set of N cameras and representing the same scene from different viewpoints, based on a 3D object model, the computing device program product comprising:

- a non-transitory computer readable medium;
- first programmatic instructions for determining a 3DMM model;
- second programmatic instructions for matching the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the i-th image and $\lambda_i$ describes the appearance/texture of the model matched to the i-th image;
- third programmatic instructions for calculating relative positions of the cameras, from which the images were collected, based on 3D transformations $H_{ij}$ of the matched 3DMM model from the i-th image to the matched 3DMM model from the j-th image;
- fourth programmatic instructions for calculating the total matching error $E_c$ for the model as a sum of matching errors of a model described by parameters $h_c$, $\rho_c$, $\lambda_c$ to individual images:

$$E_c = \sum_{i=1}^{N} E_i$$

fifth programmatic instructions for estimating the dimensions of the object based on locations of characteristic points from vector s, calculated as:

$$s = \bar{s} + \sum_k p_k \cdot \hat{s}_k$$

wherein $\bar{s}$ is the vector of the average 3DMM model shape, $p_k$ are elements of vector $\rho_c$, and $\hat{s}_k$ are eigenvalue vectors of the 3DMM model.

There is also disclosed a system for estimation of dimensions of an object present on images obtained from a set of N cameras and representing the same scene from different viewpoints, based on a 3D object model. The system comprises a 3DMM model generator for determining a 3DMM model. A model matching module is used for matching the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the i-th image and $\lambda_i$ describes the appearance/texture of the model matched to the i-th image, the matching being performed by: calculating relative positions of the cameras, from which the images were collected, based on 3D transformations $H_{ij}$ of the matched 3DMM model from the i-th image to the matched 3DMM model from the j-th image; calculating the total matching error $E_c$ for the model as a sum of matching errors of a model described by parameters $h_c$, $\rho_c$, $\lambda_c$ to individual images:

$$E_c = \sum_{i=1}^{N} E_i$$

The system further includes a dimensions estimator for estimating the dimensions of the object based on locations of particular characteristic points from vector s, calculated as:

$$s = \bar{s} + \sum_k p_k \cdot \hat{s}_k$$

wherein $\bar{s}$ is the vector of the average 3DMM model shape, $p_k$ are elements of vector $\rho_c$, and $\hat{s}_k$ are eigenvalue vectors of the 3DMM model.

Optionally, model matching may further include generating a weight mask Mask specifying the number of images, on which a particular point of model texture is visible; and calculating the total matching error of the matching of the model to each image which is further weighted by the mask Mask as:

$$E = \sum_w \frac{1}{\text{Mask}(w)} \cdot \left\| \bar{i}(w) + \sum_l \lambda_l \cdot \hat{i}_l(w) - I(F(w, p, h)) \right\|^2$$

BRIEF DESCRIPTION OF FIGURES

The presented method and system will become more apparent from the following detailed description of the preferred embodiments shown in a drawing, in which:

FIG. 4 presents an example of a setup of image acquisition system;
FIGS. 5A-5B present images of a left and a right camera;
FIGS. 6A-6B present images of a left and a right camera with 3DMMs matched;

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

DESCRIPTION OF EMBODIMENTS

Figure 1:
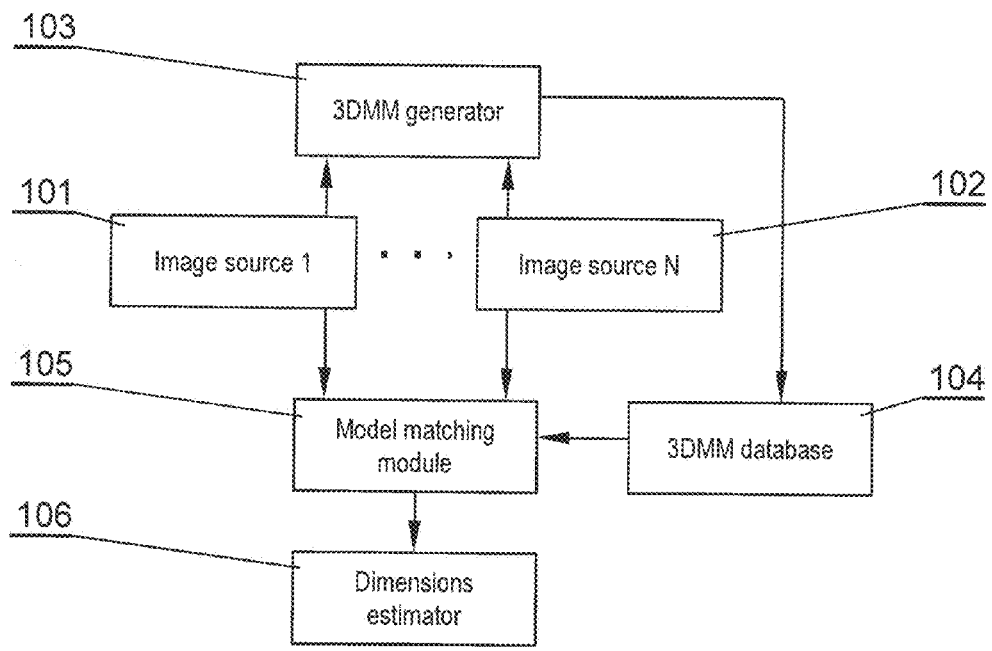
FIG. 1 presents a diagram of the system.
Figures 2A, 2B, 2C, 2D:
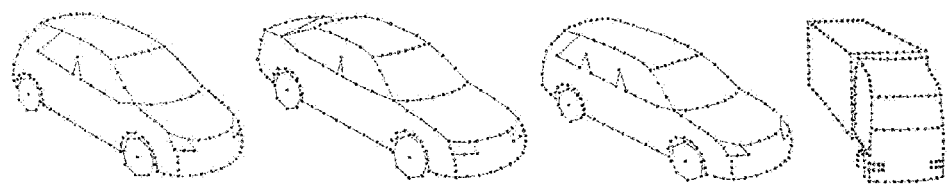
FIGS. 2A-2D present 3DMMs for different types of vehicles.

FIG. 1 presents a diagram of the system. The system comprises two image sources 101, 102, e.g. two cameras of a stereoscopic surveillance system. The images from sources 101, 102 can be used to generate an 3DMM database in an 3DMM generator 103 to be stored in 3DMM database module 104, comprising 3D shapes of typical objects for which dimensions are to be estimated. For example, the 3DMM database 104 may comprise 3DMMs for different types of vehicles, such as a hatchback, a sedan, a wagon, a truck, as presented in FIGS. 2A-2D. The 3DMMs are input, together with the images from sources 101, 102 to an image-model matching module 105. After the model is matched with the image, the dimensions of the object can be estimated in a dimensions estimator 106.

The presented embodiment relates to estimation of the dimensions of vehicles, but the presented method and system can be used for estimation of dimensions of other objects as well, such as human shape, packages in a sorting departments, products on a production lines etc.

Figure 3:
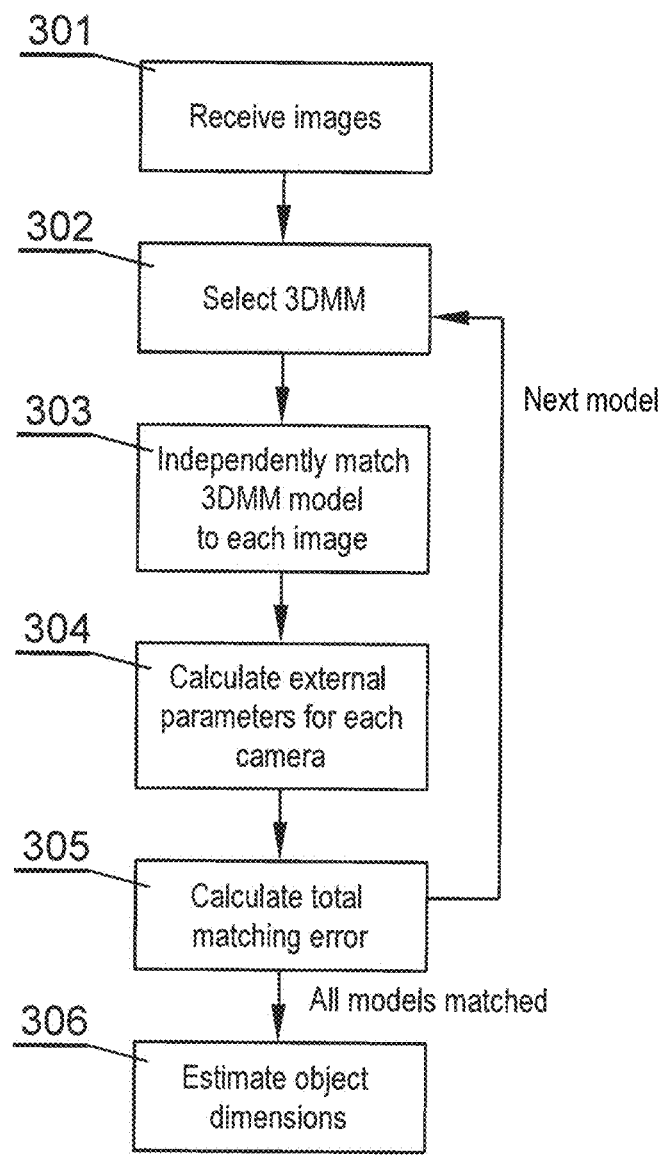
FIG. 3 presents a diagram of the general method for dimension estimation.

FIG. 3 presents a diagram of the general method for dimension estimation using 3D models. First, at least two images representing a scene are obtained in step 301. The following example will be related to a pair of stereoscopic images obtained e.g. from two cameras located alongside of a road in a setup as shown in FIG. 4, wherein the images may have a content as shown in FIG. 5A, 5B, which show images from the left and right camera. However, the described method may be also performed on a set of images comprising more than two images, e.g. three, four or more images showing the same scene from multiple points of view, in order to e.g. improve accuracy. Moreover, the cameras can be arbitrarily arranged, i.e. they do not have to be linearly arranged (with optical axes parallel), e.g. one camera may be located at one side of the road and the other camera may be located at another side of the road, and these cameras may be pointed in the same direction or even in opposite directions. In step 302, an 3DMM model is selected from the 3DMM database 104 and matched to the images in step 303 by the image-model matching module 105.

In general, the 3DMM model is defined as a shape s composed of M vertices in a three-dimensional space and covered by a texture t:

The locations of all vertices of the model are described by vector s comprising 3D coordinates (x, y, z) of each of M vertices.

$$s=(x_1,y_1,z_1,\ldots,x_M,y_M,z_M).$$

The texture vector t comprises the color components values r, g, b for each of W pixels of a texture covering the shape s.

$$t=(r_1,g_1,b_1,\ldots,r_W,g_W,b_W).$$

Since the locations of the vertices are highly correlated, the vector s can be decomposed and represented as its eigenvalues. A k-element vector p of parameters, describing the shape of the object, is used (wherein k<M):

$$s = \bar{s} + \sum_k p_k \cdot \hat{s}_k$$

wherein $\bar{s}$ is an vector of averaged shape of the 3D model, $p_k$ are 3D shape parameters and $\hat{s}_k$ are eigenvalues vectors.

The points of the texture vector are also highly correlated. Therefore, the vector t is also decomposed and represented as its eigenvalues, and an l-element vector λ of parameters of the texture covering the object is used (wherein l<W):

$$t = \bar{t} + \sum_l \lambda_l \cdot \hat{t}_l$$

wherein $\bar{t}$ is an average texture vector, $\lambda_i$, are texture parameters vectors and $\hat{t}_l$ are eigenvalues vectors.

The matching error between the model and the image is described by the equation:

$$E = \sum_w \left\| \bar{t}(w) + \sum_l \lambda_l \cdot \hat{t}_l(w) - I(F(w, p, h)) \right\|^2$$

wherein:
- h describes the orientation of the matched model with respect to the Image in the 3D space;
- p describes the 3D shape of the model matched to the image;
- λ describes the appearance/texture of the model matched to the image,
- I(w)—is the Intensity of the image in the w pixel,
- F is the warping function of a projection of 3D model to its texture.

The measured object is viewed simultaneously by a set of N cameras. It is not necessary to precisely synchronize the cameras of the set. It is enough if the synchronization accuracy is at least 1 frame of the image (e.g. 20 ms when 50 images per second are captured). Moreover, it is not necessary to precisely calibrate the set of cameras. It is enough to know the internal parameters $K_i$ of each of the cameras—because it is not necessary to know the external parameters of the cameras (i.e. the relative positioning of the cameras with respect to each other). It is assumed that the 3DMM models are available and "trained".

In step 303 the 3DMM model is matched to each of the registered N images (from N cameras) independently. As a result, N matched 3DMM models are obtained, described by parameters $h_i$, $p_i$, $\lambda_i$, wherein $h_i$ describes the orientation of the matched model with respect to the i-th image in the 3D space; $p_i$ describes the 3D shape of the model matched to the i-th image and Ai describes the appearance/texture of the model matched to the i-th image.

Since all images comprise the same object, it can be assumed that the matched 3D models represent the same object viewed from different spatial positions.

On the basis of parameters $h_i$ which describe the orientation of the matched 3DMM model, a 3D transform $H_{ij}$ of the matched 3DMM model from the i-th image to the matched 3DMM from the j-th image is calculated.

$$H_{ij}=f(h_i)\cdot g(h_j),$$

wherein f( ) is a function that transforms the orientation of the matched model to a 4×4 matrix, and g( ) is a function that transforms the orientation of the matched model to an inverse of the 4×4 matrix.

Next, in step 304, the position of the i-th camera in the global coordinate system is determined. For example, it is declared that the first camera is the origin of the global coordinate system. Then, the external parameters of the i-th camera in global coordinate system can be set as $H_{i0}$.

Next, in step 305 the obtained 3DMM model is matched to all images mutually and jointly, e.g. using the algorithm described in above-mentioned paper "Application of 3D Morphable Models to faces in video images". This matching results in a single 3DMM model having parameters $h_c$, $\rho_c$, $\lambda_c$. The matching algorithm uses a total matching error of the model to each of images:

$$E_c = \sum_{i=1}^{N} E_i$$

The procedure of selection and matching of 3DMM model in steps 302-305 is performed for all models in the 3DMM database or for pre-selected models, until the best fit is found, which is characterized by the lowest total matching error $E_c$. As a result, the model is matched to the images as shown in FIGS. 6A-6B.

In step 306 the size of the object can be determined, by the dimensions estimator module 106, based on three-dimensional locations of the characteristic points of the model having parameters $h_c$, $\rho_c$, $\lambda_c$ determined in step 305. The characteristic points are estimated with use of s vector, described by:

$$s = \bar{s} + \sum_{k} p_k \cdot \hat{s}_k$$

wherein:
 $\bar{s}$ is an vector of averaged shape of the 3D model,
 $p_k$ are elements of $\rho_c$ vector, and
 $\hat{s}_k$ are eigenvalues vectors of 3DMM.

Optionally and additionally, based on the parameters of the 3DMM model matched to all images simultaneously, the areas of the model which are visible on more than one image are determined. For each point of the texture covering a 3DMM, the number of images on which this point is visible is determined. A map of the number of images, for which this point is visible, will be used further as a weight mask—Mask.

In that case, in step 305 the 3DMM model is matched to all images simultaneously and jointly using the determined Mask. A single 3DMM model defined by parameters $h_c$, $\rho_c$, $\lambda_c$ is used. The algorithm for matching the 3DMM model to the image uses a total estimation error for each image, which is weighted by the Mask:

$$E_c = \sum_{i=1}^{N} E_i$$

$$E = \sum_{w} \frac{1}{\text{Mask}(w)} \cdot \left\| \bar{i}(w) + \sum_{l} \lambda_l \cdot \hat{i}_l(w) - I(F(w, p, h)) \right\|^2$$

The invention improves on image processing in multi-camera systems, by allowing estimating a size of an object present on a number of images representing the same scene from different points of view. Therefore, the invention provides a useful, concrete and tangible result.

Advantages obtained by application of the present invention include more accurate estimation of object dimensions. An implementation in a particular machine has been disclosed in the foregoing specification. Thus the machine or transformation test is fulfilled and that the idea is not abstract.

It can be easily recognized, by one skilled in the art, that the aforementioned method for estimating a size of an object may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the Invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for estimation of dimensions of an object present on images obtained from a set of N cameras and representing the same scene from different viewpoints, based on a 3D object model, the method comprising the steps:
 determining a 3D Morphable Model (3DMM) model;
 matching the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the i-th image and $\lambda_i$, describes the appearance/texture of the model matched to the i-th image;
 calculating relative positions of the cameras, from which the images were collected, based on 3D transformations $H_{ij}$ of the matched 3DMM model from the i-th image to the matched 3DMM model from the j-th image;

calculating the total matching error $E_c$ for the model as a sum of matching errors of a model described by parameters $h_c$, $\rho_c$, $\lambda_c$ to individual images:

$$E_c = \sum_{i=1}^{N} E_i$$

estimating the dimensions of the object based on locations of characteristic points from vector s, calculated as:

$$s = \bar{s} + \sum_{k} p_k \cdot \hat{s}_k$$

wherein $\bar{s}$ is the vector of the average 3DMM model shape, $\rho_k$ are elements of vector $\rho_c$, and $\hat{s}_k$ are eigenvalue vectors of the 3DMM model.

2. The method of claim 1, further comprising:
generating a weight mask Mask specifying the number of images, on which a particular point of model texture is visible,
calculating the total matching error of the matching of the model to each image which is further weighted by the mask Mask as:

$$E = \sum_{w} \frac{1}{\text{Mask}(w)} \cdot \left\| \bar{i}(w) + \sum_{l} \lambda_l \cdot \hat{i}_l(w) - I(F(w, p, h)) \right\|^2$$

wherein:
h describes the orientation of the matched model with respect to the image in the 3D space;
ρ describes the 3D shape of the model matched to the image;
λ describes the appearance/texture of the model matched to the image,
I(w) is the intensity of the image in the w pixel,
F is the warping function of a projection of 3D model to its texture.

3. A non-transitory computer readable medium storing a computing device program product for estimation of dimensions of an object present on images obtained from a set of N cameras and representing the same scene from different viewpoints, based on a 3D object model, the computing device program product comprising:
first programmatic instructions for determining a 3D Morphable Model (3DMM) model;
second programmatic instructions for matching the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the t-th image and $\lambda_i$ describes the appearance/texture of the model matched to the i-th image;
third programmatic instructions for calculating relative positions of the cameras, from which the images were collected, based on 3D transformations $H_{ij}$ of the matched 3DMM model from the i-th image to the matched 3DMM model from the j-th image;
fourth programmatic instructions for calculating the total matching error $E_c$ for the model as a sum of matching errors of a model described by parameters $h_c$, $\rho_c$, $\lambda_c$ to individual images:

$$E_c = \sum_{i=1}^{N} E_i$$

fifth programmatic instructions for estimating the dimensions of the object based on locations of characteristic points from vector s, calculated as:

$$s = \bar{s} + \sum_{k} p_k \cdot \hat{s}_k$$

wherein $\bar{s}$ is the vector of the average 3DMM model shape, $\rho_k$ are elements of vector $\rho_c$, and $\hat{s}_k$ are eigenvalue vectors of the 3DMM model.

4. A system for estimation of dimensions of an object present on images obtained from a set of N cameras and representing the same scene from different viewpoints, based on a 3D object model, the system comprising:
a 3DMM model generator for determining a 3D Morphable Model (3DMM) model;
a model matching module for matching the 3DMM model to each of N images of the set in order to determine a set of parameters $h_i$, $\rho_i$, $\lambda_i$, wherein $h_i$ describes the orientation of the matched model with respect to the i-th image; $\rho_i$ describes the 3D shape of the model matched to the r-th image and $\lambda_i$ describes the appearance/texture of the model matched to the i-th image, the matching being performed by:
calculating relative positions of the cameras, from which the images were collected, based on 3D transformations $H_{ij}$ of the matched 3DMM model from the i-th image to the matched 3DMM model from the j-th image;
calculating the total matching error $E_c$ for the model as a sum of matching errors of a model described by parameters $h_c$, $\rho_c$, $\lambda_c$ to individual images:

$$E_c = \sum_{i=1}^{N} E_i$$

a dimensions estimator for estimating the dimensions of the object based on locations of characteristic points from vector s, calculated as:

$$s = \bar{s} + \sum_{k} p_k \cdot \hat{s}_k$$

wherein $\bar{s}$ is the vector of the average 3DMM model shape, $\rho_k$ are elements of vector $\rho_c$, and $\hat{s}_k$ are eigenvalue vectors of the 3DMM model.

5. The system according to claim 4, wherein the model matching module is further configured to perform:
generating a weight mask Mask specifying the number of images, on which a particular point of model texture is visible,
calculating the total matching error of the matching of the model to each image which is further weighted by the mask Mask as:

$$E = \sum_w \frac{1}{\text{Mask}(w)} \cdot \left\| \bar{t}(w) + \sum_l \lambda_l \cdot \hat{t}_l(w) - I(F(w, p, h)) \right\|^2$$

wherein:
- h describes the orientation of the matched model with respect to the image in the 3D space;
- ρ describes the 3D shape of the model matched to the image;
- λ describes the appearance/texture of the model matched to the image,
- I(w) is the intensity of the image in the w pixel,
- F is the warping function of a projection of 3D model to its texture.

* * * * *